US008662615B2

(12) United States Patent
Zama et al.

(10) Patent No.: US 8,662,615 B2
(45) Date of Patent: Mar. 4, 2014

(54) METHOD OF PRINTING A BARCODE USING A LINE PRINTHEAD, AND A PRINTING

(75) Inventors: Masanori Zama, Matsumoto (JP); Yuya Iwasa, Tohmi (JP); Shunichi Shimada, Sakaki-machi (JP); Shigeru Omi, Azumino (JP)

(73) Assignee: Seiko Epson Corporation, Tokyo (JP)

( * ) Notice: Subject to any disclaimer, the term of this patent is extended or adjusted under 35 U.S.C. 154(b) by 385 days.

(21) Appl. No.: 13/075,902

(22) Filed: Mar. 30, 2011

(65) Prior Publication Data

US 2011/0242173 A1 Oct. 6, 2011

(30) Foreign Application Priority Data

Mar. 30, 2010 (JP) ................................ 2010-077513

(51) Int. Cl.
*B41J 29/38* (2006.01)
*B41J 2/01* (2006.01)

(52) U.S. Cl.
USPC ............ 347/14; 347/1; 347/5; 347/9; 347/12; 347/13

(58) Field of Classification Search
USPC ........................................ 347/5, 9, 12, 13, 14
See application file for complete search history.

(56) References Cited

U.S. PATENT DOCUMENTS 7,641,302 B2 * 1/2010 Lee ................................ 347/19
7,780,287 B2 * 8/2010 Yamagata et al. ............ 347/107
8,052,243 B2 * 11/2011 Shimizu .......................... 347/19
8,235,522 B2 * 8/2012 Yamagata et al. ............ 347/107
2008/0068413 A1 * 3/2008 Habuka .......................... 347/13

FOREIGN PATENT DOCUMENTS

JP 59-136264 A 8/1984
JP 08238790 A * 9/1996 .............. B41J 2/355
JP 09-24627 A 1/1997
JP 2001-270143 A 10/2001
JP 2003-145734 A 5/2003
JP 2006-44027 A 2/2006
JP 2009160808 A * 7/2009
JP 2010000684 A * 1/2010

* cited by examiner

*Primary Examiner* — Laura Martin
*Assistant Examiner* — Jeremy Bishop
(74) *Attorney, Agent, or Firm* — Nutter McClennen & Fish LLP; John J. Penny, Jr.; Christina M. Sperry

(57) ABSTRACT

A barcode printing method can easily and quickly find the location of a group of consecutive printing elements that can print a barcode correctly when the line print head has faulty printing elements. The printing device determines the shift range for the barcode printing position, aligns the center of the barcode print data with the center of the shift range, from this position alternately shifts the print data one printing element at a time left and right in the line direction, and finds a group of consecutive printing elements that can print the barcode correctly. A normal printing range can thus be found in a short time with the smallest shift compared with searching from the end of the shift range, and the overall efficiency of a barcode printing operation that executes repeatedly can be improved.

10 Claims, 5 Drawing Sheets

L5
AND range
D1(1)
D2(1)
ST1
ST2
ST3

METHOD OF PRINTING A BARCODE USING A LINE PRINTHEAD, AND A PRINTING

BACKGROUND

1. Technical Field

The present invention relates to a barcode printing method for printing barcodes using a line print head having printing elements arrayed in a line, and to a printing device for the same.

2. Related Art

One-dimensional barcodes that are printed using a line thermal head and have bars of specified widths formed in a specific pattern perpendicular to the transportation direction of the recording medium (referred to herein as "picket fence barcodes") display information using the pattern of the bar widths and the spaces between the bars in the barcode. As a result, if any of the printing elements of the line print head are damaged such that some print dots cannot be formed, bars may be lost or the bar width or space between the bars may vary, and the expected information may not be displayed. To address this problem, a method of printing a barcode when some printing elements of the line print head are faulty and cannot print normally by shifting the printing position of the barcode widthwise (in the line direction of the line print head) so that the barcode can be printed using a series of printing elements not including the faulty printing elements is known from the literature.

Japanese Unexamined Patent Appl. Pub. JP-A-H09-24627 teaches an inkjet image recording device that detects the locations of faulty dot printing elements by reading the printed barcode with a scanner, and prints barcodes using dot printing elements not including the faulty dot printing elements by shifting the paper widthwise based on the result of detecting the faulty dot printing elements.

Japanese Unexamined Patent Appl. Pub. JP-A-2003-145734 teaches an inkjet barcode recording device that detects the locations of faulty nozzles using a scanner, and prints the barcode using a nozzle group not including the faulty nozzles at a position shifted widthwise from the initial printing position on the recording medium.

Japanese Unexamined Patent Appl. Pub. JP-A-2006-44027 teaches a thermal printing device that detects a group of heat elements that does not include faulty dots in a short time even when there are faulty heat elements in plural locations, and prints barcodes at a position shifted widthwise to the recording medium using the detected group of heat elements.

Such methods of shifting the printing position must find a part of the line print head where there is a group of consecutive normally functioning printing elements that can print the desired barcode. If faulty printing elements are found at plural locations, finding such a continuous group of normal printing elements can be time-consuming.

For example, in the printing device described in JP-A-2006-44027, a range of high usage frequency printing elements is predefined in the printing element array in order to shorten the search time, and this range is searched to find a continuous series of normal printing elements that can print the barcode. Because this search operation restricts looking for printing elements that can print the barcode to a limited range, the likelihood of determining that printing the barcode is not possible and the barcode thus not being printed is high. This method is therefore not practical.

The method described in JP-A-2006-44027 finds the location of a group of continuous printing elements that can print normally by shifting the barcode print data one dot at a time right and left in the line direction, and uses the group of printing elements that was found with the least shift distance to print the barcode. This pattern-matching operation is time-consuming, however, and not efficient.

In addition, faulty heat elements in a thermal head include both heat elements that do not heat when energized, and heat elements that heat when not driven.

Methods of the related art that only treat elements that cannot form print dots as faulty printing elements can result in printing unnecessary print dots where there is supposed to be a space instead of a printed bar, and printing a defective barcode with wider than expected bars or no spaces where expected may be unavoidable.

SUMMARY

A barcode printing method and printing device according to the invention can easily and quickly find a group of consecutive printing elements that can normally print a barcode when there are faulty printing elements. A barcode printing method and printing device according to another aspect of the invention can also avoid printing a faulty barcode as a result of faulty printing elements printing when not driven and forming unnecessary print dots.

A first aspect of the invention is a method of printing a barcode using a line print head to print a barcode having bars of specific widths arranged in a specific pattern in a direction perpendicular to a recording medium transportation direction, the method including: a normal/faulty data calculation step that acquires normal/faulty data representing the normal or faulty state of each printing element in the line direction of the printing element array disposed to the line print head; a determination step that compares the normal/faulty data with the barcode print data, and determines if a faulty printing element is included in the printing element array of the line print head in the barcode printing range in the line direction; a shiftable range calculation step that calculates a shift range to which the barcode can be shifted in the line direction and printed when a faulty printing element is contained in the printing element array; a shift destination calculation step that performs a shift operation to find a normal printing range where the barcode can be printed correctly in the line direction of the line print head by alternately executing an operation that aligns the center of the print data in the line direction with the center of the shift range in the line direction, sequentially shifts the print data one printing element to one side in the line direction, and compares the normal/faulty data and the line print data, and an operation that sequentially shifts the print data one printing element to the other side in the line direction, and compares the normal/faulty data and the line print data; and a printing process step that executes a printing process to print the barcode using the printing elements contained in the normal printing range when a normal printing range is found in the shift range.

After calculating the range to which the barcode can be shifted, the center of the barcode print data is aligned with the center of the shift range in the line direction. The print data is then alternately shifted one printing element at a time left and right in the line direction from this position to find a normal printing range where the barcode can be printed normally. By thus looking for a normal printing range starting from the center of the range in which the barcode can be shifted, the first normal printing range found will be the range with the smallest shift, and further searching is unnecessary. Therefore, a normal printing range with the smallest shift can be found in less time than when starting to search from the right end or left end of the shift range. The overall efficiency of a barcode printing process that executes repeatedly can therefore be improved.

In another aspect of the invention, the normal/faulty data preferably includes first normal/faulty data representing the position of a first faulty printing element that does not print when driven, and second normal/faulty data representing the position of a second faulty printing element that prints when not driven;

In this aspect of the invention, the normal/faulty data calculation step calculates both the first normal/faulty data and the second normal/faulty data. The determination step makes a first determination that compares the first normal/faulty data and the print data, and determines if the first faulty printing element is contained in the printing element array corresponding to the barcode printing position in the line direction, and makes a second determination that compares the second normal/faulty data and the print data, and determines if the second faulty printing element is contained in the printing element array corresponding to the barcode printing position in the line direction. The shift destination calculation step performs a shift operation to find a normal printing range not containing a first faulty printing element at any print dot formation position of the barcode shifted in the line direction, and not containing a second faulty printing element at any position in the barcode where a print dot is not formed.

By including data about the second faulty printing elements that print even when not driven in the normal/faulty data, the problem of these second faulty printing elements resulting in defective barcodes being printed, a problem that occurs with the technology of the related art, can be solved.

Further preferably, the method of printing a barcode using a line print head according to another aspect of the invention also has a fault density calculation step that divides the shift range calculated by the shiftable range calculation step into plural segments, and calculates the density of faulty printing elements in each segment where the density is (number of faulty printing elements/number of printing elements in segment), and the shift destination calculation step performs a shift operation to find a normal printing range for the barcode after aligning the center in the line direction of the line print data with the center in the line direction of the segment with the lowest density.

By starting to look for a normal printing range in the segment with the lowest density (frequency of occurrence) of faulty printing elements, a normal printing range can be found in even less time. As a result, the efficiency of the barcode printing process can be further improved.

The line print head may be a line thermal head or a line inkjet head.

Another aspect of the invention is a printing device including: a line print head having a plurality of printing elements in a row; a transportation mechanism that conveys a recording medium relative to the line print head in a transportation direction that is perpendicular to the line direction in which the printing elements are arrayed; and a control circuit that controls driving the line print head and the transportation mechanism, and executes a printing operation to print on the recording medium a barcode composed of a pattern of printed areas and unprinted areas arrayed in a direction perpendicular to the transportation direction. The control circuit includes a normal/faulty data calculation unit that acquires normal/faulty data representing the normal or faulty state of each printing element in the line direction of the printing element array disposed to the line print head; a determination unit that compares the normal/faulty data with the barcode print data, and determines if a faulty printing element is included in the printing element array of the line print head in the barcode printing range in the line direction; a shiftable range calculation unit that calculates a shift range to which the barcode can be shifted in the line direction and printed when a faulty printing element is contained in the printing element array; a shift destination calculation unit that performs a shift operation to find a normal printing range where the barcode can be printed correctly in the line direction of the line printhead by alternately executing an operation that aligns the center of the print data in the line direction with the center of the shift range in the line direction, sequentially shifts the print data one printing element to one side in the line direction, and compares the normal/faulty data and the line print data, and an operation that sequentially shifts the print data one printing element to the other side in the line direction, and compares the normal/faulty data and the line print data; and a printing process unit that executes a printing process to print the barcode using the printing elements contained in the normal printing range when a normal printing range is found in the shift range.

Preferably, the normal/faulty data includes first normal/faulty data representing the position of a first faulty printing element that does not print when driven, and second normal/faulty data representing the position of a second faulty printing element that prints when not driven.

In this aspect of the invention, the normal/faulty data calculation unit calculates both the first normal/faulty data and the second normal/faulty data. The determination unit makes a first determination that compares the first normal/faulty data and the print data, and determines if the first faulty printing element is contained in the printing element array corresponding to the barcode printing position in the line direction, and makes a second determination that compares the second normal/faulty data and the print data, and determines if the second faulty printing element is contained in the printing element array corresponding to the barcode printing position in the line direction. The shift destination calculation unit performs a shift operation to find a normal printing range not containing a first faulty printing element at any print dot formation position of the barcode shifted in the line direction, and not containing a second faulty printing element at any position in the barcode where a print dot is not formed.

Further preferably, the control circuit also includes a fault density calculation unit that divides the shift range calculated by the shiftable range calculation step into plural segments, and calculates the density of faulty printing elements in each segment where the density is (number of faulty printing elements/number of printing elements in segment).

In this case, the shift destination calculation unit performs a shift operation to find a normal printing range for the barcode after aligning the center in the line direction of the line print data with the center in the line direction of the segment with the lowest density.

EFFECT OF THE INVENTION

After calculating a shift range where the barcode can be printed in the line direction, the center of the barcode print data is aligned with the center of the shift range in the line direction. The print data is then alternately shifted one printing element at a time left and right in the line direction from this position to find a normal printing range where the barcode can be printed normally. By thus looking for a normal printing range starting from the center of the range in which the barcode can be shifted, a normal printing range with the smallest shift can be found in less time than when starting to search from the right end or left end of the shift range, and the overall efficiency of a barcode printing process that executes repeatedly can therefore be improved.

Other objects and attainments together with a fuller understanding of the invention will become apparent and appreciated by referring to the following description and claims taken in conjunction with the accompanying drawings.

DESCRIPTION OF EMBODIMENTS

A preferred embodiment of a printing device having a line thermal head for printing barcodes according to the present invention is described below with reference to the accompanying figures.

General Configuration of Printing Device

Figure 1:
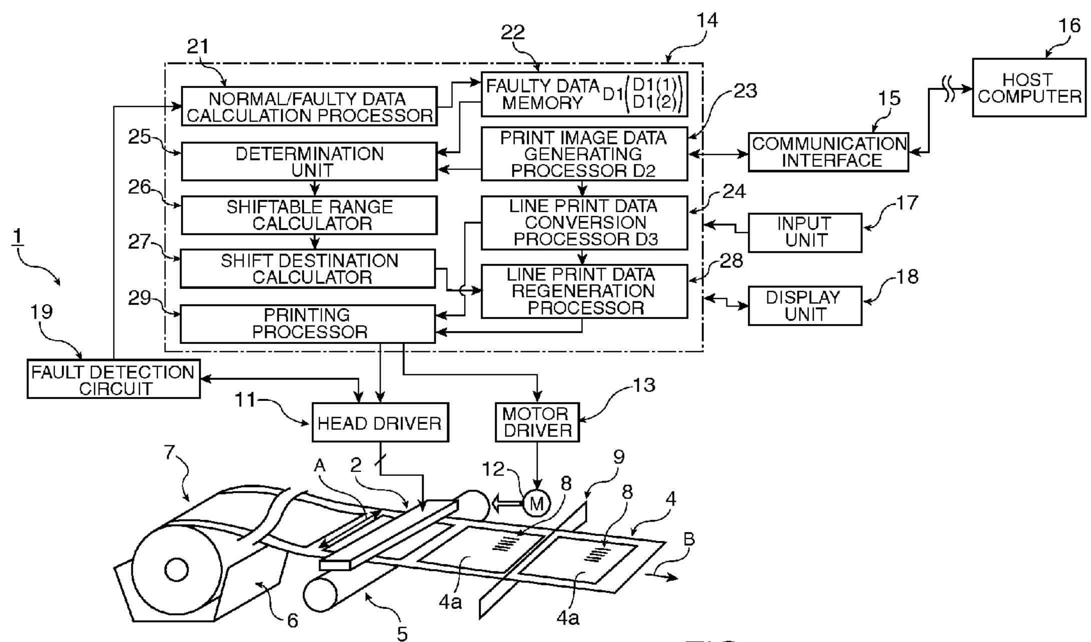
FIG. 1 schematically describes the configuration of a printing device for printing barcodes according to a preferred embodiment of the invention.
Figure 2A:
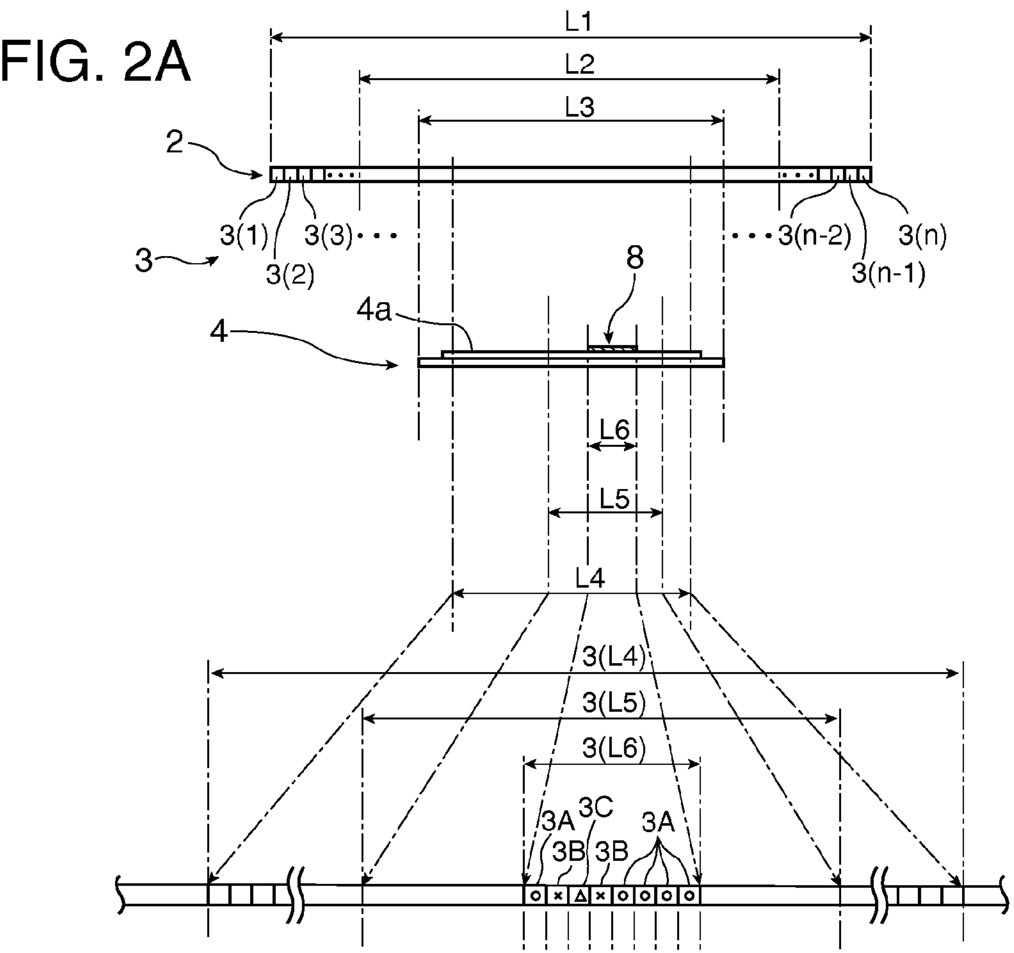
FIGS. 2A and 2B describes the barcode printing process of the printing device shown in FIG. 1.
Figure 2B:
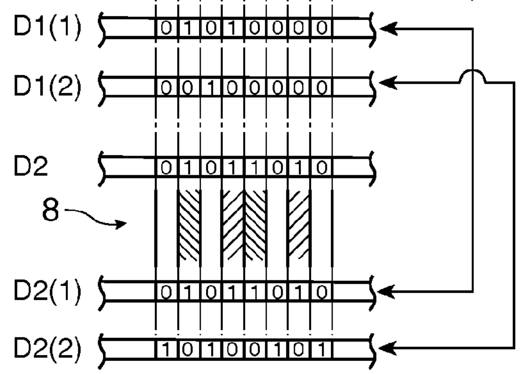

FIG. 1 schematically describes the configuration of a printing device according to this embodiment of the invention, and FIGS. 2A and 2B describe the barcode printing process.

As shown in these figures, the printing device 1 has a line thermal head 2 and a plurality of heat elements 3(1) to 3(*n*) (collectively referred to below as heat element 3) disposed on the line thermal head 2 in one row, for example, in the line direction A (widthwise to the printer). A platen roller 5 is pressed to the line thermal head 2 with the recording medium to be printed, such as label paper 4, therebetween. The label paper 4 is supplied from roll paper 7 stored in a roll paper compartment 6, for example. The label paper 4 is conveyed by the platen roller 5 in transportation direction B perpendicular to the line direction A (the row direction of the heat elements) of the line thermal head 2, for example. Barcodes 8 (also called picket fence barcodes below) each composed of a particular combination of bars (printed areas) of specific widths and spaces (non-printed areas) of specific widths are printed on the labels 4*a* of the label paper 4 by the line thermal head 2 in the label width direction (line direction A) perpendicular to the transportation direction B. The printed part of the label paper 4 is then discharged from a paper exit 9 formed in the outside case (not shown in the figure) of the printing device 1.

The line thermal head 2 is driven by a head driver 11, the label paper 4 is rotationally driven by a paper feed motor 12, and the paper feed motor 12 is driven by a motor driver 13. The head driver 11 and motor driver 13 are controlled by a control circuit 14 that controls driving the printing device 1.

The control circuit 14 includes a CPU, ROM, and RAM, and is connected to a host computer 16 through a communication interface 15. An input unit 17 and display unit 18 of the printing device 1 are connected to the control circuit 14. A fault detection circuit 19 that detects faulty heat elements on the line thermal head 2 is connected to the control circuit 14.

The control circuit 14 activates according to a print command supplied from the host computer 16, starts conveying the label paper 4 by means of the platen roller 5 and drives the line thermal head 2 to print data such as a barcode supplied with the print command on a label 4*a* of the conveyed label paper 4. As shown in FIG. 2A, the line length of the line thermal head 2, that is, the line length L1 of the heat elements, is greater than the maximum printable paper width L2. Other printing condition settings including the paper width L3 and the maximum printing width L4 of the conveyed label paper 4 are stored and held in the control circuit 14 before printing starts.

Barcode Printing Process

The control circuit 14 functions as the processing units described below by executing a control program stored in ROM during the barcode 8 printing operation.

The normal/faulty data calculation processor 21 of the control circuit 14 obtains normal/faulty data D1 for each of the heat elements 3(1) to 3(*n*) in the line direction A.

The normal/faulty data calculation processor 21 uses the fault detection circuit 19 to check for any faulty heat elements in the heat elements 3(1) to 3(*n*) of the line thermal head 2. The normal/faulty data calculation processor 21 also creates a normal/faulty data pattern arraying the data in the detection results indicating normal and faulty heat elements in the line direction A, and stores this pattern in the faulty data memory 22. The fault detection circuit 19 detects if the heat elements are functioning properly by detecting a voltage drop or change in resistance in the heat elements 3(1) to 3(*n*) when the heat elements 3(1) to 3(*n*) are energized through the head driver 11 during a print standby period, for example.

A print image data generating processor 23 and a line print data conversion processor 24 of the control circuit 14 run a process that generates print image data based on the print data received through the communication interface 15, and converts the generated print image data to line print data for each line printed by the line thermal head 2. If picket fence barcode data D2 is contained in the print image data, line print data D3 for printing a picket fence barcode is generated by converting the barcode 8 print data to line print data for each line.

The determination unit 25 of the control circuit 14 compares the barcode 8 print data D2 with first and second normal/faulty data patterns D1(1) and D1(2) as the normal/faulty data D1 stored in the faulty data memory 22. The determination unit 25 also determines if there is a faulty heat element 3B, 3C at any printing position in the barcode 8 printing range in the line direction A. More specifically, if the barcode 8 printing range in the line direction A is range L6 on the label paper 4, the presence of faulty heat elements 3B, 3C in the heat element group 3(L6) corresponding to this printing range L6 is determined as shown in FIGS. 2A and 2B.

A shiftable range calculator 26 calculates a print area shift range to which the barcode 8 can be shifted within the line direction A (label paper width direction) for printing. As shown in FIGS. 2A and 2B, the shiftable range calculator 26 calculates shift range L5, which is the range in which the print range L6 can be shifted left and right in the line direction A.

A shift destination calculator 27 runs a pattern matching process that shifts the barcode 8 print range L6 left and right within the shift range L5 to find a normal printing range where the barcode 8 can be printed normally. In other words, the shift destination calculator 27 shifts the heat element group 3 (L6), the length of which corresponds to the print range L6 where the barcode 8 is printed, within the heat element group 3 (L5) corresponding to the shift range L5 to find a shift position where the heat element group 3(L6) does not contain the faulty heat elements 3B, 3C. This shift destination calculation process is described in detail below.

A line print data regeneration processor 28 runs a process that regenerates (reconverts) the line print data when the printing position where the barcode 8 is printed is shifted so that the barcode 8 can be printed at the new printing position.

A printing processor 29 controls driving the head driver 11 and motor driver 13 based on the original line print data or the regenerated line print data to print the print data containing the barcode 8.

Faulty Heat Element Detection Range and Detection Operation

The normal/faulty data calculation processor 21 of the control circuit 14 checks for normal and faulty heat elements 3 in the line direction A using the fault detection circuit 19 at predetermined times. The detection operation of the fault detection circuit 19 could be applied to all heat elements 3, but the detection range in this embodiment of the invention is limited to shorten the detection time and shorten the time required by the shift destination calculation process described below.

As shown in FIGS. 2A and 2B, the total line length of the line thermal head 2, that is, the line length L1 of the heat element 3, is greater than the maximum printable paper width L2, and the parts of the heat elements on opposite ends of the maximum printable paper width L2 are basically not used. In addition, the paper width L3 of the conveyed label paper 4 and the maximum printing width L4 thereof are determined based on the print settings. As a result, the heat elements 3 used to print the label paper 4 are only the heat elements 3 that are included in the group of heat elements 3(L4) corresponding to the maximum printing width L4.

The normal/faulty data calculation processor 21 tests the heat elements 3(L4) that are used and sets the heat elements 3(L4) at preset times. For example, the heat elements 3(L4) are checked first when the label paper 4 is loaded after the printing device 1 is turned on, checked whenever the label paper 4 is reset, and checked when new label paper 4 is loaded, and the test range is set. Whether or not the label paper 4 is set is determined based on the access cover to the roll paper compartment 6 being opened and closed. The normal/faulty check is also regularly performed, such as during printer standby modes, and when an appropriate command is received from the input unit 17 of the printing device 1 or from the host computer 16. After testing for faulty and normal heat elements 3 in the group of heat elements 3(L4) selected for testing, the normal/faulty data calculation processor 21 executes a process to store the normal/faulty data pattern calculated from the test results in the faulty data memory 22, or to update the normal/faulty data pattern if already stored.

Normal/Faulty Data Pattern

Heat elements 3 that are not normal heat elements 3A include faulty heat elements 3B that cannot form printed dots when energized, and faulty heat elements 3C that become energized and form print dots even when not driven. As shown in FIG. 2B, normal/faulty data patterns include a first normal/faulty data pattern D1(1) in which, for example, a 1 denotes faulty heat elements 3B, and a 0 denotes normal heat elements 3A and faulty heat elements 3C; and a second normal/faulty data pattern D1(2) in which a 1 denotes faulty heat elements 3C and a 0 denotes normal heat elements 3A and faulty heat elements 3B.

Determining if Correcting the Barcode Printing Position is Necessary

As described above, the determination unit 25 of the control circuit 14 compares the first and second normal/faulty data patterns D1(1), D1(2) that are stored in faulty data memory 22 with the barcode 8 print data D2, and determines if there are any faulty heat elements 3B, 3C at the barcode 8 printing position L(6) in the line direction A.

As shown in FIG. 2B, in this example the barcode 8 print data D2 contains is denoting where print dots are formed, and 0s denoting where print dots are not formed.

In this situation the determination unit 25 generates data pattern D2(1) for avoiding the effect of faulty heat elements 3B based on the print data D2. If a faulty heat element 3B is positioned to the location of a dot denoted 1, the dot will not be printed correctly in the barcode, resulting in such problems as an unnecessary white stripe appearing in the printed barcode.

The determination unit 25 similarly generates data pattern D2(2) for avoiding the effect of faulty heat element 3C. If a faulty heat element 3C is positioned to the location of a dot denoted 1, an unnecessary dot will be formed where not wanted and the barcode will not be printed correctly, resulting in such problems as a space not being created between the printed bars of the barcode.

The determination unit 25 then calculates the AND of the bits in the generated data pattern D2(1) and the normal/faulty data pattern D1(1); calculates the AND of data pattern D2(2) and normal/faulty data pattern D1(2); and calculates the AND of data pattern D2(2) and normal/faulty data pattern D1(2). If the resulting AND of all bits is 0, the determination unit 25 determines there is no need to correct the printing position. More specifically, the determination unit 25 determines that there are no faulty heat elements 3B, 3C at the position specified by the line print data, and the barcode 8 can be printed normally.

However, if the AND returns a 1 bit for even one heat element, the determination unit 25 determines the printing position must be corrected. In this case the barcode 8 cannot be printed correctly because a faulty heat element 3B, 3C is present in the barcode printing position.

Barcode Printing Process when Printing Position Correction is Unnecessary

Figure 3:
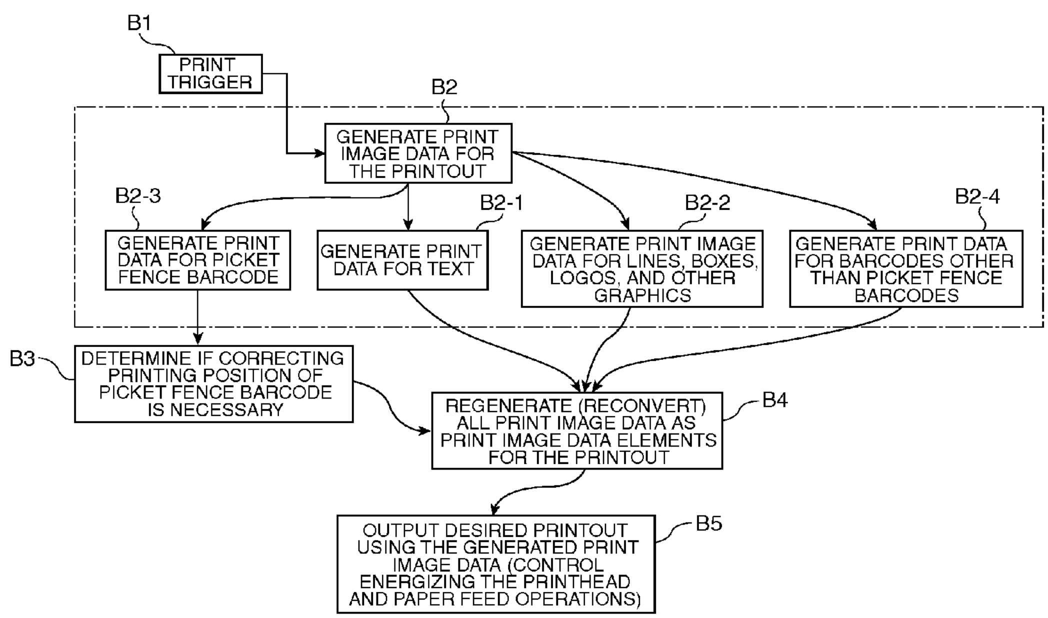
FIG. 3 is a flow chart of the barcode printing process when printing position correction is not needed.

FIG. 3 is a flow chart of the barcode 8 printing process when it is determined that correcting the printing position is not necessary.

Referring to FIG. 3, the print image data generating processor 23 of the control circuit 14 starts the printing operation (block B1) when print data is received through the communication interface 15, and generates the print image data based on the received print data (block B2). More specifically, print image data is generated based on the print data, including generating print image data for text (block B2-1), generating print image data for graphic elements including line drawings and logos (block B2-2), generating picket fence barcode 8 print data (block B2-3), and generating print data for barcodes other than picket fence barcodes 8 (block B2-4).

Based on the picket fence barcode 8 print data, the determination unit 25 then determines if printing position correction is required (block B3). Because FIG. 3 is an example of a case in which printing position correction is not needed, printing position correction is determined to be unnecessary, and the generated print image data is converted by the line print data conversion processor 24 to line print data for each line (block B4). Based on the line print data, the printing processor 29 controls driving the line thermal head 2 and platen roller 5 by means of the head driver 11 and motor driver 13, and prints synchronized to label paper 4 conveyance (block B5).

Barcode Printing Process when Printing Position Correction is Necessary

Figure 4:
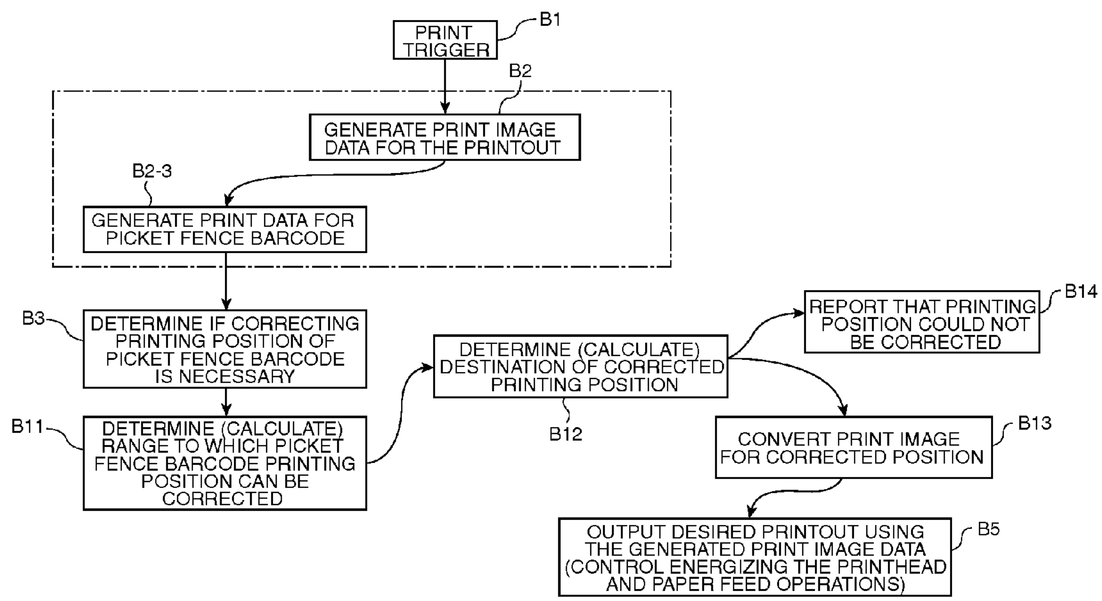
FIG. 4 is a flow chart of the barcode printing process when printing position correction is needed.

FIG. 4 is a flow chart of the barcode 8 printing process when it is determined that correcting the printing position is necessary.

In this case, too, the print image data generating processor 23 of the control circuit 14 starts the printing operation (block B1) when print data is received through the communication interface 15, and generates the print image data based on the received print data (block B2). More specifically, print image data is generated based on the print data, including generating print image data for text (not shown), generating print image data for graphic elements including line drawings and logos (not shown), generating picket fence barcode 8 print data (block B2-3), and generating print data for barcodes other than picket fence barcodes 8 (not shown). Based on the picket fence barcode 8 print data, the determination unit 25 then determines if printing position correction is required (block B3).

In this example, there are faulty heat elements 3B, 3C among the heat elements 3 in the group of tested heat elements 3(L4) as shown in FIG. 2B. As a result, the determination unit 25 determines that printing position correction is necessary.

When correcting the printing position of the picket fence barcode 8 is determined necessary, the shiftable range calculator 26 calculates the shift range to which the picket fence barcode 8 can be shifted in the line direction A (label paper width direction) and printed (block B11). When the printing position of other print markings, including text or graphic elements printed at a position adjacent to or near the picket fence barcode 8 in the line direction A, is fixed to a predetermined position, the shift range L5 is the maximum printing range in the line direction A that will not interfere with printing these other markings. In this example, shift range L5 where the print range L6 of the picket fence barcode 8 can be shifted left or right is calculated as shown in FIG. 2B.

The shift destination calculator 27 then executes a pattern matching process that shifts the print range L6 of the picket fence barcode 8 left and right in the line direction A within the shift range L5 to find a normal print range where the picket fence barcode 8 can be printed correctly (block B12). This process shifts the heat element group 3(L6), the length of which corresponds to the print range L6 for printing the picket fence barcode 8, left and right in the heat element group 3(L5) corresponding to shift range L5, and finds a shift position (the printing position of the picket fence barcode 8 after correction) where a heat element group 3(L6) of a length able to correctly print the barcode 8 can be obtained.

Figure 5:
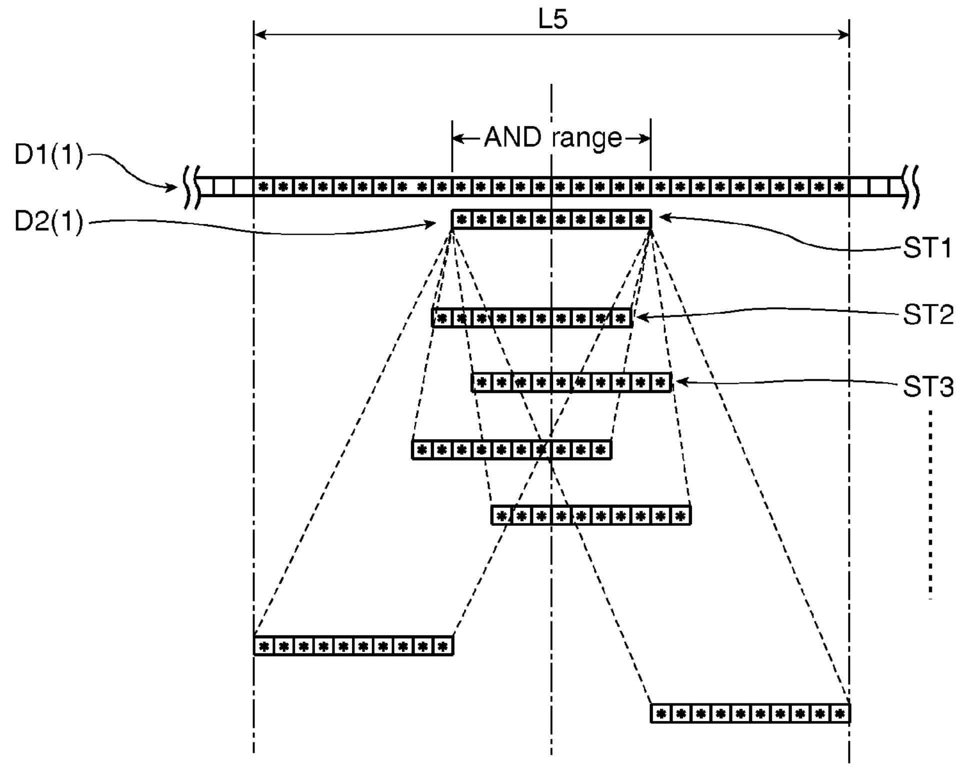
FIG. 5 describes the shift destination calculation process for correcting the printing position.

FIG. 5 describes the concept of this shift destination calculation process. In this shift destination calculation process, the center in the line direction A of the first data pattern D2(1) created from the barcode 8 line print data D2 is aligned with the center in the line direction A of the data pattern corresponding to the shift range L5 in the first normal/faulty data pattern D1(1) (step ST1). Next, the first data pattern D2(1) is shifted one dot (one heat element) to one side in the line direction A, and the first normal/faulty data pattern D1(1) is compared with the first data pattern D2(1) (step ST2). More specifically, the AND is calculated for corresponding bits in both patterns, and whether the AND is 0 for all bits is determined. The first data pattern D2(1) is then shifted one dot in the opposite direction, the AND of corresponding bits is calculated, and whether the AND is 0 for all bits is determined (step ST3). This operation repeats by alternately shifting one bit each right and left.

The second data pattern D2(2) is likewise shifted left and right in the shift range L5 while being compared with the second normal/faulty data pattern D1(2).

Referring again to FIG. 4, when a position where the AND of all bits is 0 when compared with first and second normal/faulty data patterns D1(1) and D1(2) is found, the shift position with the shortest shift distance is set as the printing position of the picket fence barcode 8. The print image data is then corrected and the corrected print image data is converted to line print data so that the picket fence barcode 8 will be printed at the shift position (block B13). The printing processor 29 then controls driving the line thermal head 2 and platen roller 5 based on the generated print data and prints the picket fence barcode 8 at the corrected printing position on a label 4*a* of the label paper 4 (block B5).

If a shift destination is not found, that is, when a position where a heat element group 3(L6) in which there are no faulty heat elements 3B, 3C is not found, a report to that effect is presented on the display unit 18 or returned to the host computer 16, and the printing process ends unconditionally (block B14).

Variation of the Shift Destination Calculation Process

To execute the shift destination calculation process efficiently when the shift range L5 is wide, the possibility of finding a shift destination in a short time can be increased by executing the shift destination calculation process from the part of the shift range L5 where the density of faulty heat elements is lowest.

Figure 6:
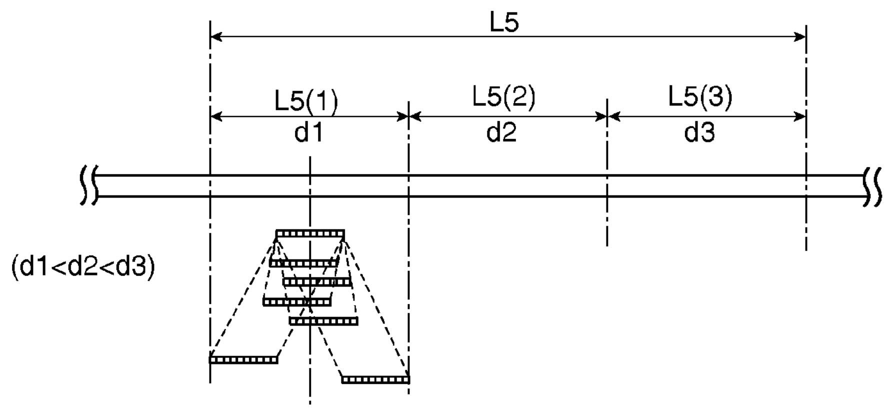
FIG. 6 describes another example of the shift destination calculation process for correcting the printing position.

This process can be performed by rendering a fault density calculation processor in the shift destination calculator 27 of the control circuit 14 to calculate the density of faulty heat elements 3B, 3C. For example, as shown in FIG. 6, the shift range L5 is divided into a plurality of segments in the line direction A, rendering a left segment L5(1), middle segment L5(2), and right segment L5(3), for example. The density d1, d2, d3 (=number of faulty heat elements/number of heat elements in segment) of the faulty heat elements 3B, 3C is then calculated for each segment.

The center in the line direction A of the first data pattern D2(1) is then aligned with the center in the line direction A of the segment with the lowest density of faulty heat elements. For example, if density d1 is lowest, the center of the first data pattern D2(1) is aligned with the center of left segment L5(1) as shown in FIG. 6. As described in FIG. 5, the pattern matching process then executes alternately shifting one bit left and right to find the shift destination.

The same operation is performed with second data pattern D2(2). If a shift destination is not found with this process, either the printing process aborts, or the pattern process repeats to find a shift destination in the segment with the next lowest density, that is, middle segment L5(2) in the example shown in FIG. 6.

OTHER EMBODIMENTS

The preferred embodiment described above relates to a printing device having a line thermal head, but the invention is not so limited and can also be applied to printing picket fence barcodes by means of dot matrix print methods that use a line print head such as a line inkjet head, for example. The recording medium is also not limited to label paper.

The foregoing describes generating normal/faulty data pattern representing the locations of two types of faulty printing elements as the faulty printing elements, and correcting the printing position of the picket fence barcode based thereon. However, if eliminating only the faulty printing elements that cannot print is sufficient, the picket fence barcode printing position can be corrected using only one type of normal/faulty data pattern.

Although the present invention has been described in connection with the preferred embodiments thereof with reference to the accompanying drawings, it is to be noted that various changes and modifications will be apparent to those skilled in the art. Such changes and modifications are to be understood as included within the scope of the present invention as defined by the appended claims, unless they depart therefrom.

What is claimed is:

1. A method of printing a barcode using a line print head to print a barcode having bars of specific widths arranged in a specific pattern in a direction perpendicular to a recording medium transportation direction, comprising:

a normal/faulty data calculation step that acquires normal/faulty data representing a normal or faulty state of each printing element in a printing element array of the line head in a line direction of the printing element array;

a determination step that compares the normal/faulty data with barcode print data, and determines if a faulty printing element is included in the printing element array of the line print head in a barcode printing range in the line direction;

a shiftable range calculation step that calculates a shift range to which the barcode can be shifted in the line direction and printed when a faulty printing element is contained in the printing element array, the shift range having a maximum width in the line direction that is less than a maximum width of the printing element array in the line direction and that is greater than a maximum width of the barcode printing range;

a shift destination calculation step that performs a shift operation to find a normal printing range where the barcode can be printed correctly in the line direction of the line print head by alternately executing an operation that aligns a center of the barcode print data in the line direction with a center of the shift range in the line direction, sequentially shifts the barcode print data one printing element to one side in the line direction, and compares the normal/faulty data and the barcode print data, and an operation that sequentially shifts the barcode print data one printing element to another side in the line direction, and compares the normal/faulty data and the barcode print data; and a printing process step that executes a printing process to print the barcode using the printing elements contained in the normal printing range when the normal printing range is found in the shift range, wherein: the normal/faulty data includes first normal/faulty data representing the position of a first faulty printing element that does not print even when driven, and second normal/faulty data representing the position of a second faulty printing element that prints even when not driven; the normal/faulty data calculation step calculates both the first normal/faulty data and the second normal/faulty data; the determination step makes a first determination that compares the first normal/faulty data and the barcode print data, and determines if the first faulty printing element is contained in the printing element array corresponding to a barcode printing position in the line direction, and makes a second determination that compares the second normal/faulty data and the barcode print data, and determines if the second faulty printing element is contained in the printing element array corresponding to the barcode printing position in the line direction; and the shift destination calculation step performs a shift operation to find a normal printing range not containing the first faulty printing element at any print dot formation position of the barcode shifted in the line direction, and not containing the second faulty printing element at any position in the barcode where a print dot is not formed.

2. The method of printing a barcode using a line print head described in claim 1, further comprising:

a fault density calculation step that divides the shift range calculated by the shiftable range calculation step into plural segments, and calculates a density of faulty printing elements in each segment where the density is (number of faulty printing elements/number of printing elements in segment);

wherein the shift destination calculation step includes executing the operations within the segment with a lowest density, with the operation that aligns including aligning the center of the barcode print data with a center of the segment with the lowest density in the line direction.

3. The method of printing a barcode using a line print head described in claim 1, wherein:

the line print head is a line thermal head or a line inkjet head.

4. A printing device comprising:

a line print head having a plurality of printing elements in a row, the printing elements being in an array;

a transportation mechanism that conveys a recording medium relative to the line print head in a transportation direction that is perpendicular to a line direction in which the printing elements are arrayed; and a control circuit that controls driving the line print head and the transportation mechanism, and executes a printing operation to print on the recording medium a barcode composed of a pattern of printed areas and unprinted areas arrayed in a direction perpendicular to the transportation direction, the control circuit including a normal/faulty data calculation unit that acquires normal/faulty data representing a normal or faulty state of each printing element in the line direction of the printing element array;

a determination unit that compares the normal/faulty data with barcode print data, and determines if a faulty printing element is included in the printing element array of the line print head in a barcode printing range in the line direction;

a shiftable range calculation unit that calculates a shift range to which the barcode can be shifted in the line direction and printed when a faulty printing element is contained in the printing element array, the shift range having a maximum width in the line direction that is less than a maximum width of the printing element array in the line direction and that is greater than a maximum width of the barcode printing range;

a shift destination calculation unit that performs a shift operation to find a normal printing range where the barcode can be printed correctly in the line direction of the line print head by alternately executing an operation that aligns a center of the barcode print data in the line direction with a center of the shift range in the line direction, sequentially shifts the barcode print data one printing element to one side in the line direction, and compares the normal/faulty data and the barcode print data, and an operation that sequentially shifts the barcode print data one printing element to another side in the line direction, and compares the normal/faulty data and the barcode print data; and a printing process unit that executes a printing process to print the barcode using the printing elements contained in the normal printing range when the normal printing range is found in the shift range, wherein: the normal/faulty data includes first normal/faulty data representing the position of a first faulty printing element that does not print even when driven, and second normal/faulty data representing the position of a second faulty printing element that prints even when not driven; the normal/faulty data calculation unit calculates both the first normal/faulty data and the second normal/faulty data; the determination unit makes a first determination that compares the first normal/faulty data and the barcode print data, and determines if the first faulty printing element is contained in the printing element array corresponding to a barcode printing position in the line direction, and makes a second determination that compares the second normal/faulty data and the barcode print data, and determines if the second faulty printing element is contained in the printing element array corresponding to the barcode printing position in the line direction; and the shift destination calculation unit performs a shift operation to find a normal printing range not containing a first faulty printing element at any print dot formation position of the barcode shifted in the line direction, and not containing the second faulty printing element at any position in the barcode where a print dot is not formed.

5. The printing device described in claim 4, wherein:

the control circuit also includes a fault density calculation unit that divides the shift range calculated by the shiftable range calculation unit into plural segments, and calculates a density of faulty printing elements in each segment where the density is (number of faulty printing elements/number of printing elements in segment); and the shift destination calculation unit performs the shift operation within the segment with a lowest density.

6. The printing device described in claim 4, wherein:

the line print head is a line thermal head or a line inkjet head.

7. The method of printing a barcode using a line print head described in claim 1, wherein:

the center of the shift range in the line direction is offset from a center of the printing element array in the line direction.

8. The method of printing a barcode using a line print head described in claim 1, wherein:

the shift range is nested within the printing element array.

9. The method of printing a barcode using a line print head described in claim 1, wherein:

the barcode is entirely printed in the printing process step using only a plurality of the printing elements in the printing element array.

10. The method of printing a barcode using a line print head described in claim 2, wherein:

the shift destination calculation step includes successively executing the operations within the segments in an order from the segment with the lowest density to the segment with the highest density.

* * * * *